No. 836,108. PATENTED NOV. 20, 1906.
H. S. FOLGER.
POCKET SEAL.
APPLICATION FILED SEPT. 29, 1905.
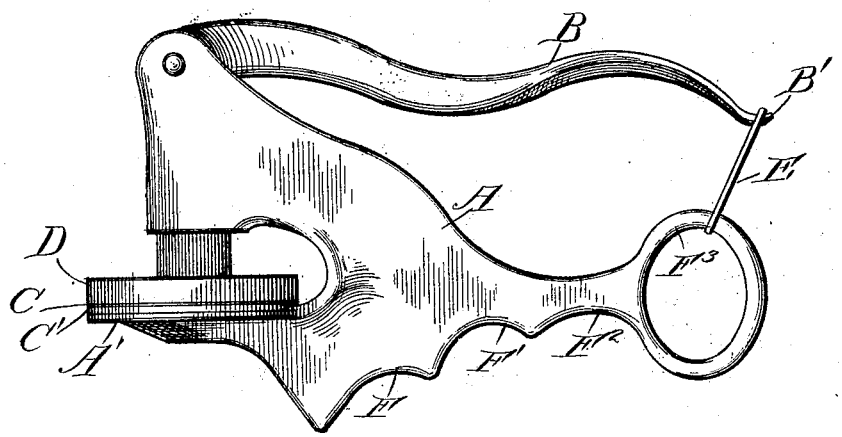
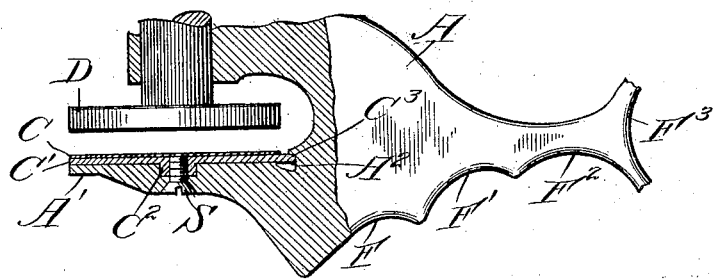
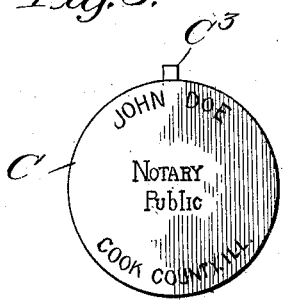
Witnesses:
O. M. Hennessy
Walter H. Redfield
Inventor:
Harry S. Folger
By Casper L. Redfield
Atty.
THE NORRIS PETERS CO., WASHINGTON, D. C.

UNITED STATES PATENT OFFICE.

HARRY S. FOLGER, OF CHICAGO, ILLINOIS.

POCKET-SEAL.

No. 836,108.　　　Specification of Letters Patent.　　Patented Nov. 20, 1906.

Application filed September 29, 1905. Serial No. 280,573.

*To all whom it may concern:*

Be it known that I, HARRY S. FOLGER, a citizen of the United States of America, and a resident of Chicago, county of Cook, and State of Illinois, have invented certain new and useful Improvements in Pocket-Seals, of which the following is a specification.

My invention relates to pocket-seals of the kind used by notaries, and has for its object improvements in such seals. In seals of this kind as ordinarily made only soft counters are used. One of the special objects of my invention is to provide means by which either soft or solid counters may be used in the same seal. I accomplish this result by using a removable plate for holding the soft counter, which plate is removed and the entire space occupied by a solid counter when a solid counter is used. Another special object is to provide the seal with permanent means for holding it closed when carried in the pocket, so that dirt may be kept out of the seal. A third special object is to make the handle part of the seal-frame so that it will fit and conform to the fingers of the hand, thus making it easier to use the seal in making an impression, especially when a sharply-defined impression is wanted on a sheet requiring a good deal of pressure.

In the accompanying drawings, Figure 1 is an elevation of the seal in its closed position. Fig. 2 is a partial elevation, partly in section, of the seal when open; and Fig. 3 is a plan of the removable plate with a soft counter secured thereto.

In the said drawings, A is the frame of the seal which carries the counter C and the handle B for moving the die-plate D. The connections from the handle B to the die-plate D are the same as those in ordinary seals and require no description.

The frame A has the lip A' of the ordinary form with a countersink at its center for receiving the boss $C^2$ on the removable plate C'. This removable plate is the one upon which the soft counter C is secured, and it has a projection or tongue $C^3$, which enters a guide-hole $A^2$ in the frame A. A screw S serves to hold the plate C' and counter C firmly in position.

It will be evident that by removing the screw S the plate C' and the soft counter C may be easily removed from the seal and that by means of the projection $C^3$ and hole $A^2$ it may be accurately replaced. In seals as ordinarily made these soft counters are secured firmly by cementing to the lip A'. As soft counters are extremely thin, they cannot be removed from ordinary seals without liability to injury, and once removed there is no accurate way for conveniently replacing them.

Solid counters are much thicker than soft counters and are cast in place. As a thick counter cannot occupy the same space as a thin one, seals as now made cannot use interchangeable counters. The ordinary practice is to use solid counters in desk-seals and soft counters in pocket-seals. By securing the soft counter to a removable plate and by making the two of the same thickness required for a solid counter I may use the same frame for either, or I can at any time remove a soft counter and supply its place with a solid counter without otherwise modifying the seal.

A common trouble with seals arranged to be carried in the pocket is the accumulation of dirt between the die-plate and the counter, and present seals provide no means for overcoming this difficulty. I accomplish this result by securing a link E to a ring at the end of the seal-frame A and by giving a slight upward turn to the end of the handle B, as shown at B'. The link E is of such length that when hooked over the upturned end B' it holds the seal closed and prevents an accumulation of dirt in the die-plate.

Another difficulty with pocket-seals is that the ordinary person cannot apply considerable pressure with them without having them hurt the fingers. I overcome this difficulty by forming in the lower part of the seal-frame A a series of curved surfaces F, F', $F^2$, and $F^3$ of such size and so spaced with regard to each other and to the handle B that when the seal is grasped in the most convenient way for use give a large bearing-surface and nearly uniform pressure on each one of the user's four fingers. This permits the user to apply his full muscular strength to the production of a clear print without suffering painful results. The number, surface, and location of the points of pressure upon the fingers all contribute to accomplishing this desirable result.

What I claim is—

In a seal of the kind described, the combination with a frame formed with a countersink and an opening, of a counter-carrying plate provided with a central boss for engaging said countersink and a peripheral projection for engaging said opening, and means for securing said plate to said frame.

Signed at Chicago, Illinois, this 23d day of September, 1905.

HARRY S. FOLGER.

Witnesses:
GERTRUDE A. HOSS,
FRED B. STEWART.